WILLIAM WICKERSHAM. 6 Sheets--Sheet 1.

Improvement in Sewing Machines.

Re. 4,785. Reissued March 5, 1872.

Witnesses.
W. L. Bennett.
Louis Seaman

Inventor
William Wickersham
by his atty
C. S. Renwick

ALL PHOTO LITHOGRAPHIC CO. N.Y. (OSBORNE'S PROCESS.)

3
WILLIAM WICKERSHAM. 6 Sheets--Sheet 2.
Improvement in Sewing Machines.
No. 4,785. Reissued March 5, 1872.
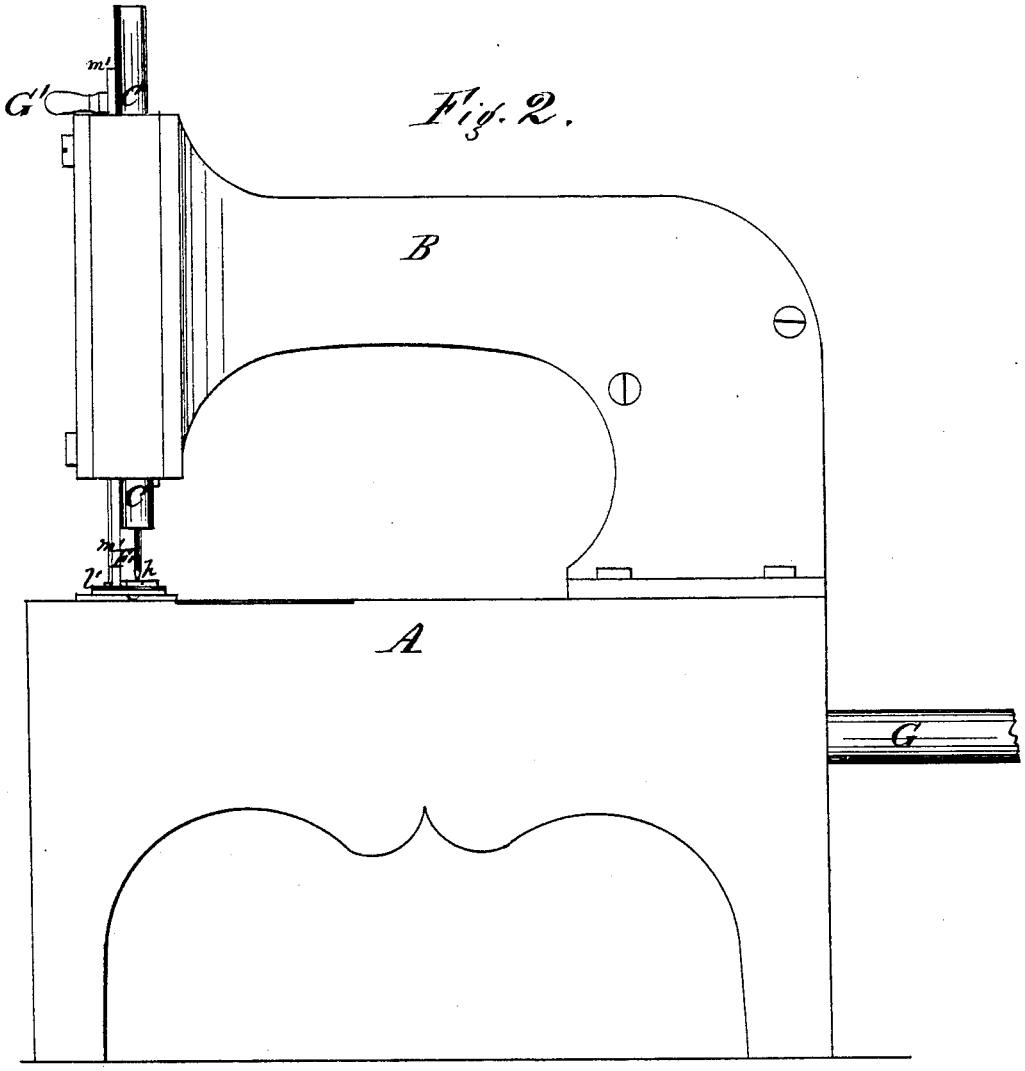
Fig. 10.
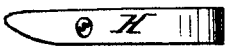
Fig. 11.
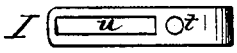
Witnesses
W. L. Bennem.
Louis Seaman
Inventor
William Wickersham
by his Attorney
C. S. Renwick

52

WILLIAM WICKERSHAM. 6 Sheets--Sheet 3.

Improvement in Sewing Machines.

No. 4,785. Reissued March 5, 1872.

Witnesses.
H. L. Bowman
Louis Seaman

Inventor
William Wickersham
by his attorney
E. S. Renwick

AM. PHOTO-LITHOGRAPHIC CO. N.Y. (OSBORNE'S PROCESS.)

WILLIAM WICKERSHAM. 6 Sheets--Sheet 4.

Improvement in Sewing Machines.

No. 4,785. Reissued March 5, 1872.

Witnesses.
W. L. Bennem.
Louis Seaman

Inventor
William Wickersham
by his Attorney
E. S. Kenrick

AM. PHOTO-LITHOGRAPHIC CO. N.Y. (OSBORNE'S PROCESS)

WILLIAM WICKERSHAM. 6 Sheets--Sheet 5.

Improvement in Sewing Machines.

No. 4,785. Reissued March 5, 1872.

Witnesses.
W. L. Bennem.
Louis Seurman

Inventor
William Wickersham
by his Attorney
C. S. Renwick

WILLIAM WICKERSHAM. 6 Sheets--Sheet 6.
Improvement in Sewing Machines.
No. 4,785. Reissued March 5, 1872.
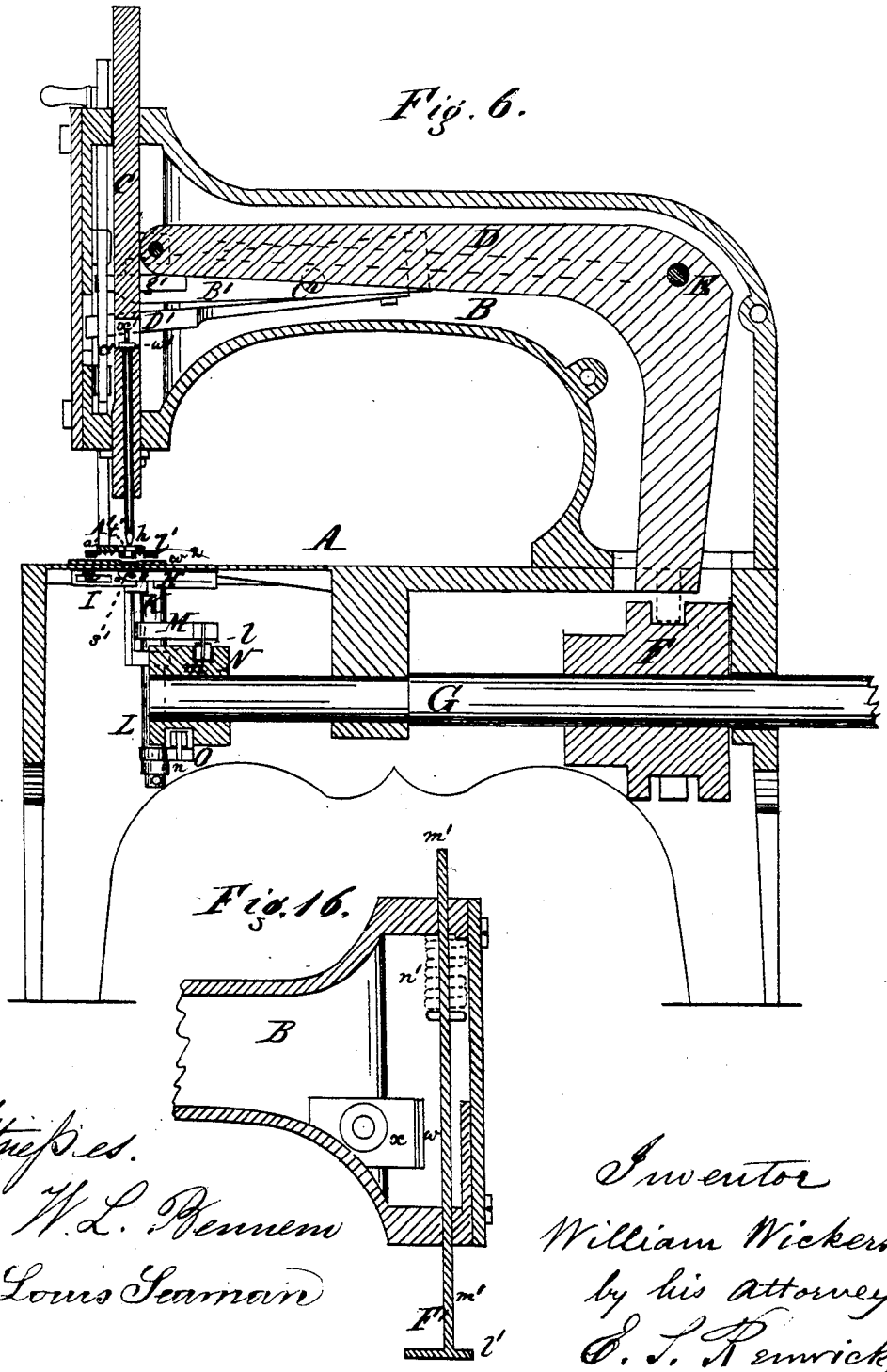
Witnesses.
W. L. Bennem
Louis Seaman
Inventor
William Wickersham
by his Attorney
C. L. Kenrick
AM. PHOTO-LITHOGRAPHIC CO. N.Y. (OSBORNE'S PROCESS.)

INITED STATES PATENT OFFICE.

BEST AVAILABLE COPY

WILLIAM WICKERSHAM, OF BOSTON, MASSACHUSETTS.

IMPROVEMENT IN SEWING-MACHINES.

ification forming part of Letters Patent No. 9,679, dated April 19, 1853; extended seven years; reissue No. 4,785, dated March 5, 1872.

DIVISION A.

Figure 1:
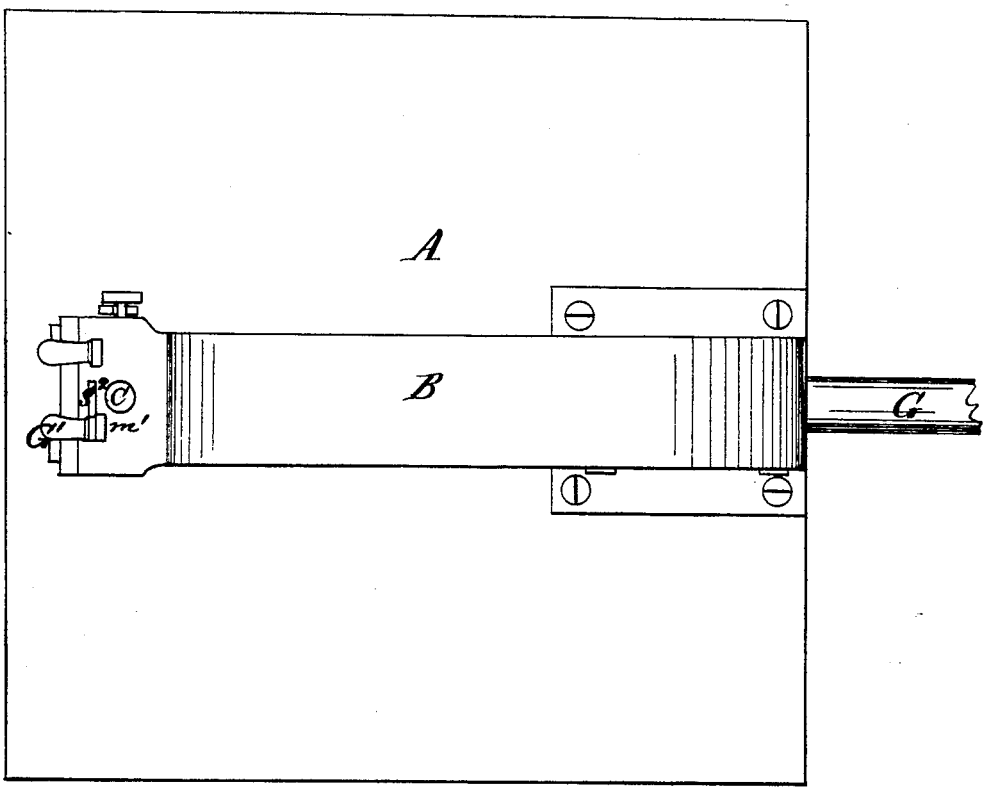
Figure 7:
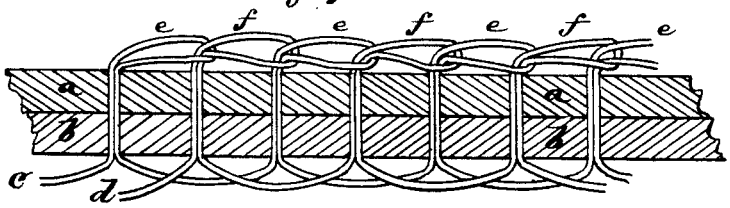
Figures 5, 8, 9:
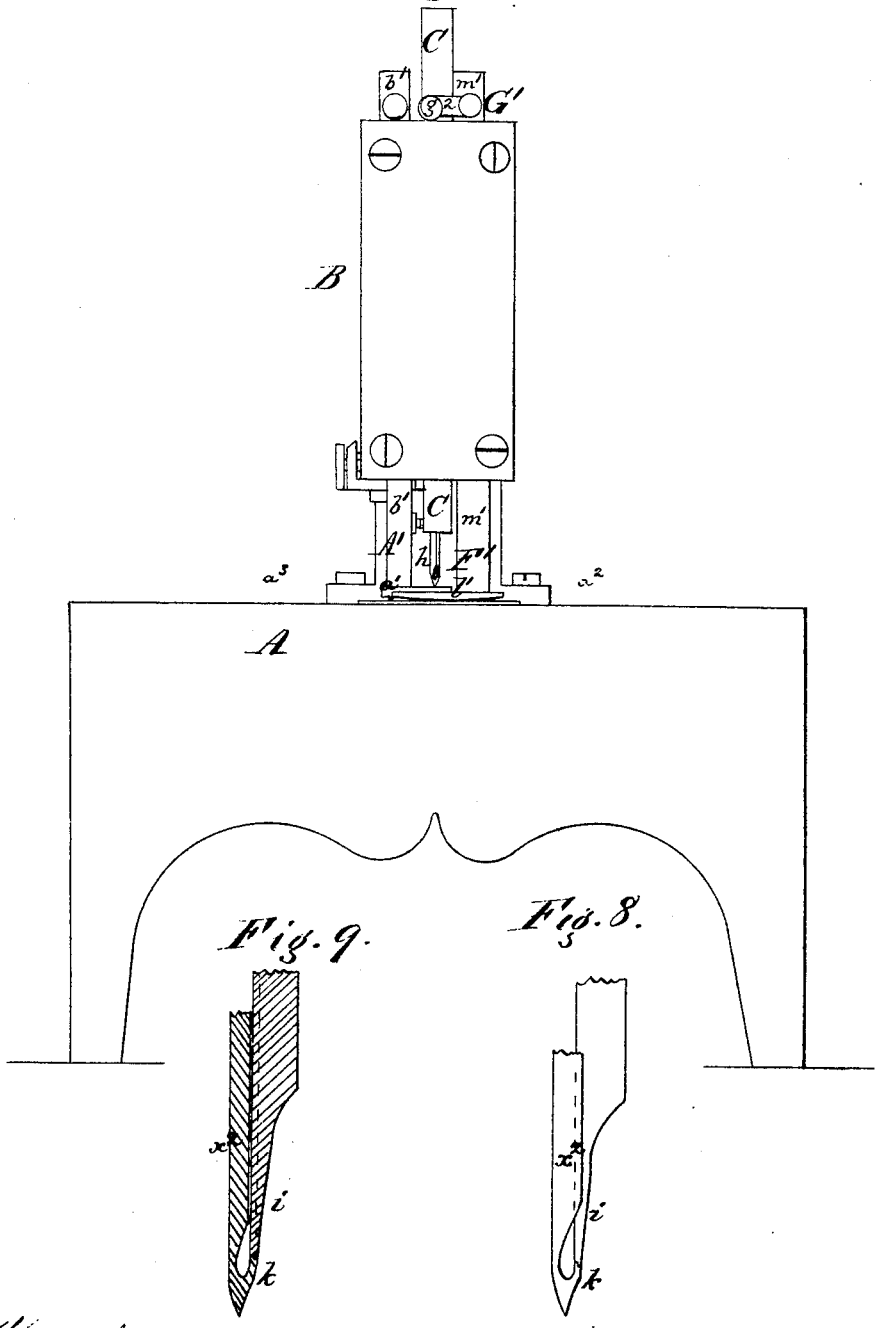
Figure 4:
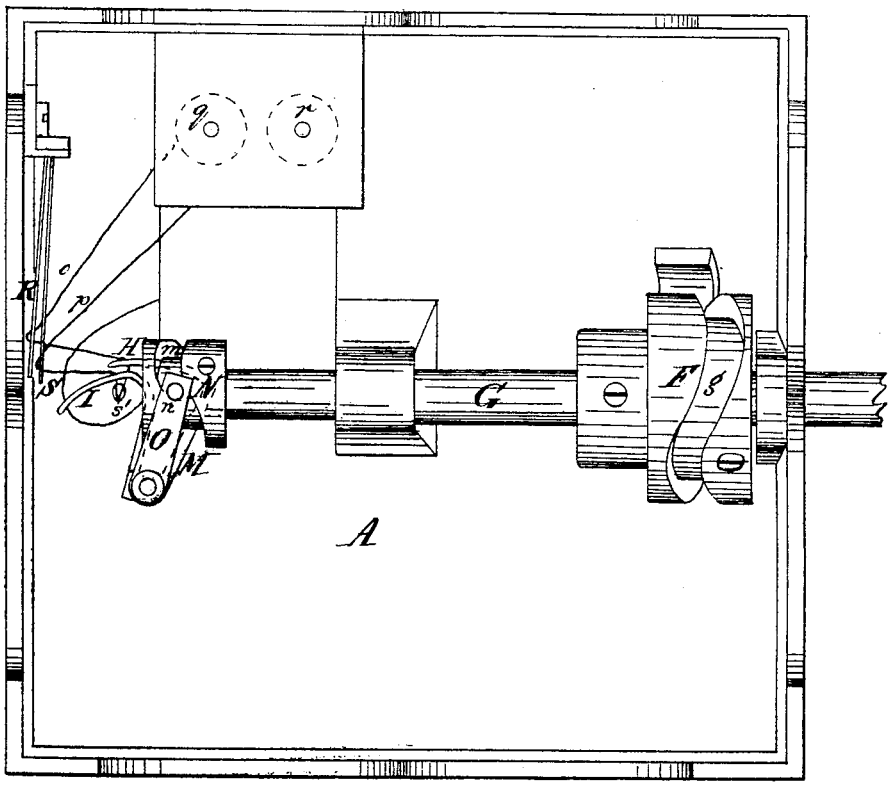

*ll whom it may concern:* e it known that I, WILLIAM WICKERSHAM, oston, in the county of Suffolk and State lassachusetts, made an invention of a new nproved Sewing-Machine, which invention ivided into two parts; and I do hereby de- e that the following is a full, clear, and ex- description and specification of one sepa- part of my said invention, the other sep- e part of the same being described and ified in another patent of the same date.

his division of the invention comprehends ain improvements in the mechanism for ing the stitch in the material to be sewed, the combination of that mechanism with ing mechanism. The said improvements embodied in the sewing-machine repre- ed in the accompanying drawing, and they specified at the close of this schedule.

the said drawing, Figure 1 represents a view; Fig. 2, a side elevation; Fig. 3, a front ation; Fig. 4, a bottom view of my said hine. Fig. 5 is a vertical and transverse ion of it, the same being taken through the -needle. Fig. 6 is a vertical and longi- nal section of it, the same being taken ugh the needle, and so as to exhibit the lle-slide and mechanism for operating the e, as well as part of the mechanism for ing cloth past the needle. Such other fig- as may be necessary to a complete de- tion and explanation of my machine will ereinafter referred to and described.

y machine for sewing cloth, leather, or oth- aterial, is calculated to sew either a chain- h with a single thread, (the formation of h is well understood,) or a stitch or pleg- formed of two threads, and so that the s of one of the said threads shall alter- ly pass through or be interlocked with e of the other, as seen in Fig. 7, in which d *b* may be supposed to represent a sec- of two layers of cloth to be sewed togeth- nd *c d*, the two threads. The loops of the d *c* are seen at *e e e*, &c., while those of the d *d* are exhibited at *f f f*, &c. In plegma- h sewing, made essentially in the manner presented in Fig. 7, the loops of one thread to bind those of the other in the cloth, so as to prevent either thread from being un- raveled or drawn out of the cloth. By this improved mode of sewing cloth, or of forming sewing by the interlooping of two threads so that the loops shall be entirely on one side of the cloth, the great objection to the ordinary chain stitch is overcome, such objection being its capability of being readily unraveled or drawn out of the cloth, as is generally well un- derstood by persons skilled in the art of sew- ing by machinery.

Figure 17:
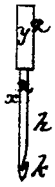
Figure 5:
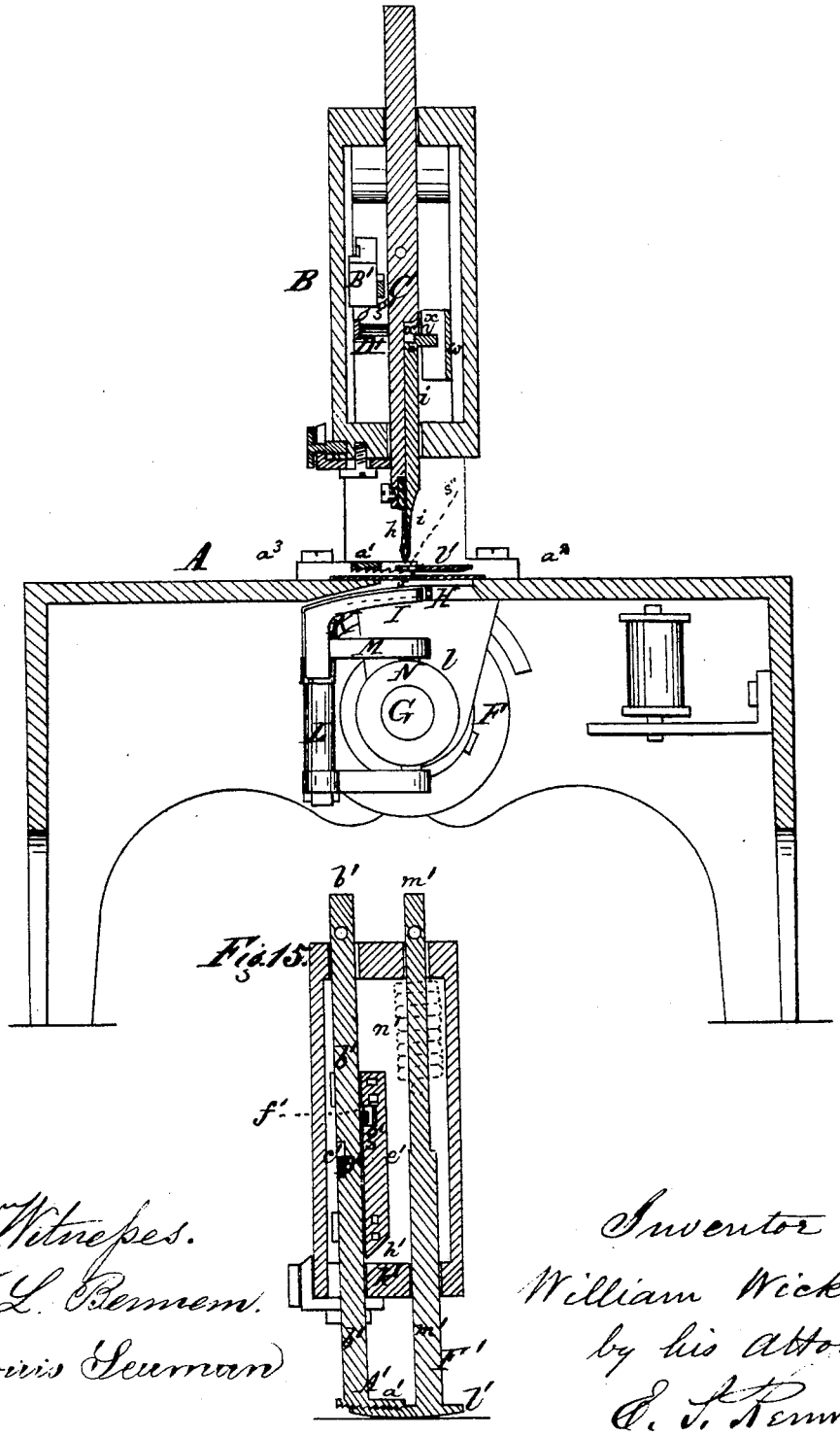

In the said drawing, A represents the frame or table of the machine, to which a hollow arm, B, is affixed and made to extend above and over the upper surface of the table, as seen in the drawing. The said arm supports the nee- dle-carrier C, which is a rod or bar of metal, constructed to move freely up and down in a vertical direction, and to be jointed to the ex- treme end of the upper arm of a bent lever, D, that plays vertically on a fulcrum-pin, as seen at E. The movement of the lever D is effected by means of a grooved cam, F, fixed on the driving-shaft G, the lower end of the said le- ver or a projection therefrom being made to extend into the groove *g* of the cam, which is to be formed so as to impart to the needle-car- rier its proper movements. The needle is seen at *h*. It is inserted in a socket in the carrier C, and is made to extend down from the lower end thereof, and it is formed as represented in side view at Fig. 17, on an enlarged scale in Fig. 8, and in section in Fig. 9. It is a pointed instrument, having a stem, $x^2$, and an enlarged shank, $y^2$, which is received in the socket of the needle-carrier C. The stem of the needle is hook-pointed, and in connection with this hook there is a small slide, *i*, that is arranged as seen in the drawing, and made to work up and down in a groove formed in the stem and shank of the needle. This slide also prevents the needle from turning around in its socket, and determines the position of the hook in ref- erence to the axis of the needle-carrier before it is fastened by the set-screw. Its lower end, when brought down upon the barb *k* of the hook, closes the entrance of the hook so as to form an eye for the thread; and as said slide *i* is so moved down on the barb previous to its

BEST AVAILABLE COPY upward movement through the cloth, it prevents the barb from catching in the cloth. The mode of operating the slide *i* will be hereinafter more particularly explained. The needle is caused to move up and down through a hole or throat in the table plate of the machine.

In connection with the hook or needle, two thread-guides or carriers, H I, are employed. They consist of two curved arms or thin blades of steel, that respectively project from or are connected to two vertical rock-shafts, K L, and are perforated with eyes to hold the thread. An arm, M, extends at right angles from one of the said shafts, and carries a small projection or stud, *l*, that is made to enter the groove *m* of a cam, N, that is fixed on the driving or main shaft G. There is an arm, O, extended from the other shaft, which arm carries a projection or stud, *n*, that is made to enter the groove of the said cam N, but at the side of the cam opposite that at which the arm M is situated, the groove being so made as to impart a movement to each thread-carrier, such as will cause it to operate at the proper time to lay its thread across the hook of the needle after the latter has been moved down through the cloth. The threads are seen at *o* and *p*. They respectively proceed from bobbins *q r*, suitably placed. Each thread before it is passed through the eye or hole of the thread-guide or carrier, is passed through an eye or hole made through one end of a draft-spring, R or S. The object of said draft-spring is to draw their respective threads into the cloth, and to keep them always straight, so that the thread-carriers may throw the thread into the hook of the needle.

Figure 12:
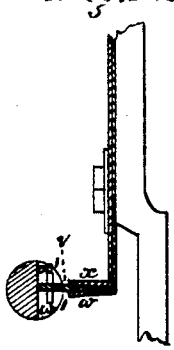
Figure 13:
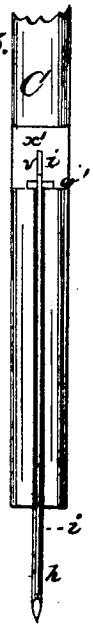

In Figs. 10 and 11, I have exhibited separate side views of the thread-guides H I, the holes or eyes for the passage of the thread through each of them being seen at *s* and *t*. In the thread-guide I, having the eye *t*, there is an elongated slot or hole, *u*, made in front of the hole *t*. In sewing with two threads, they are carried respectively through the eyes *s* and *t*; but in using one thread only, for the purpose of making the ordinary chain-stitch, it is carried from the bobbin through the tension-spring, and thence through the eye *s* of the guide H, and through the elongated slot *u* of the guide I; such slot being essential to the correct laying of the thread over the hook of the needle by the two guides, when they are arranged as represented in the drawing, so as also to be capable of operating with two threads, for the slot *u* of the guide I allows the thread to move forward with the guide H, and thus prevents the drag on the thread which would otherwise follow. The needle-slide *i* has a small projection, *v*, that extends from the upper part of it and between two spring-plates *w x*, (see Fig. 5 and also Fig. 12, which denotes a horizontal section of the needle-slide and its spring-plates,) the said spring-plates being made to strongly press against the projection on the opposite sides of it. There is also a small pin or projection, *w'*, that extends through the needle-slide somewhat below the projection *v*, as seen in Fig. 13, which denotes a side view of the needle, its carrier and slide, the same showing the slide in edge view. The said pin or projection *w'* is arranged within a notch, *x'*, formed in the middle of the needle-carrier, the whole being arranged so that the slide during each up and down movement of the needle may be caused to operate as follows—that is to say, during the descent of the needle it will pass down entirely through the cloth and far enough to carry its lower end a short distance below the lower side of the cloth.

The spring-plates *w x* are made to grasp the projection *v* so as to produce sufficient friction to prevent the slide from descending with the needle until the upper side of the notch of the needle-carrier abuts against the head of the slide. As soon as this takes place, the needle-slide will be moved downward, and its lower end will pass through the cloth, but not so far through it as will the top of the barb of the needle. The needle may then be said to be opened, so that a thread may be laid in the hook of it by one of the thread-guides. Such thread having been so laid in the hook of the needle, the needle is next raised upward and will pass upward independently of the needle-slide, (which in the meantime is prevented from rising by the frictional pressure of the plates *x w*,) until the lower end of the slide is met by the ascending barb of the needle, or until the lower side of the notch of the needle-carrier is brought up against the pin *w'*. When this takes place the needle is so closed, or its barb protected, that the said barb can pass freely upward through the cloth and through the preceding loop without catching in either. The needle-slide afterward rises with the needle until the upward movement of the needle ceases. When the downward movement of the needle next takes place, the clamp-plates *x w* cause the slide *i* to remain stationary a short interval of time, until the needle-bar descends away from it, which motion will take place until the upper side of the notch of the carrier strikes against the top part of the needle-slide, which occurring, the needle-slide will move downward with the needle, as before described. The clamp-plates, as thus described, hold the needle-slide by frictional contact, so that it does not commence to move at the same instant as the needle, while the two sides of the notch of the needle-carrier constitute bumpers connected with the needle-carrier for moving the needle-slide at the required times.

The mechanism for feeding the cloth under the needle with an intermittent movement may thus be described: The cloth rests on the top of the table, and whenever the needle is raised out of the cloth the latter is moved forward a distance equal to the length of each stitch, the cloth remaining at rest while the needle is in it. For this purpose I make use of a propeller, A', which consists of a plate of metal, *a'*, made rough, or formed with teeth on its under sur-

Figure 14:
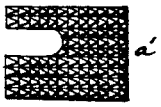

BEST AVAILABLE COPY face. This piece of metal rests on the top of the cloth and partly around the needle. It is seen in under-side view in Fig. 14. It is affixed to the lower end of a bar, $b'$, that slides freely up and down in the front part or end of the arm B, and is elevated to move the propeller from the material, and thus release it by means of a lever, B′, that turns on a fulcrum at C′, and is so jointed or connected at its rear end with the upper arm of the bent lever D as to be caused to play or vibrate on its fulcrum by the said lever D when in motion. A spring, D′, has one end affixed to the lower side of the lever B′, while the other end is made to pass through a notch, $c'$, formed in the feed-bar $b'$, as seen in Fig. 15, which denotes a vertical cross-section of the end of the hollow arm B taken through the feed-bar $b'$. A bar, $e'$, is arranged to slide against one edge of the feed-bar $b'$, and is constructed with a notch or slot, $f'$, for the reception of the projection $g'$ from the lever B′. The lower end of the slide-bar $e'$ is made with an inclined plane, $h'$, which, while the said bar is pressed downward by the action of the lever B′, will be moved against the inclined surface of the stationary part $k'$ of the arm B, and will move the feed-bar $b'$ laterally, so as to move the cloth the distance of the length of a stitch, the spring D′ pressing the propeller down on the cloth in the mean time. By the lateral reaction of the spring D′ the propeller is moved backward to place, when the inclined plane $h'$ is raised above the part or projection $k'$.

Besides the feeding mechanism I make use of a cloth-presser, F′, which is simply a plate of metal, $l'$, arranged, as seen in the drawing, and fixed on the lower end of a vertical bar or stem, $m'$, which slides freely up and down, and is pressed downward by a helical spring, $n'$. Fig. 16 denotes a longitudinal sectional view of the arm B, made so as to exhibit the presser and its spring, together with the clamp-plates $w$ $x$, as hereinbefore described. The presser rests on the cloth and keeps it down, so that it may not be lifted by the action of the needle.

During the operation of my machine the needle is made to pass down through the cloth, and with its barb a short distance from the lower end of the needle-slide, which is also carried down through the cloth. One of the thread-guides or carriers is next moved so as to carry its thread into the opening of the hook, so that at the next rise of the needle the thread will be drawn up through the cloth in the form of a loop. Next, the needle is raised upward and out of and above the cloth, and pulls the thread through it in the form of a loop. Next, the needle descends through the said loop, while the needle-slide is stationary. Next, the slide descends with the needle, as before, and the other thread-guide is moved so as to lay its thread into the opening of the hook. The hook or needle again rises and forms a new loop, and draws it through the cloth and through the loop next before formed. In this way the sewing operation is performed with two threads, one of which will serve as a binding thread to the other. The feeding or advance of the cloth is effected while the needle is out of it, the connection of the lever B′ with the lever D causing the front of the former lever to depress the slide-bar $e'$, while the latter lever, with the needle, is rising. The advancing movement of the propeller is thus so timed as to take place while the hook is holding the loop of thread, which has been passed through the cloth from its opposite side.

Having thus described my machine, what I claim is as follows: I lay no claim to the combination of a single-hooked needle and two thread-guides or carriers when they are combined to operate together as in a knitting-machine, and for the purpose of laying two threads over a needle during the progress of the formation of a knit fabric; but

What I do claim as my invention or improvement in machines for sewing is—

1. The combination of a single needle and two thread-guides carrying separate threads, so operated that, during one passage of the needle through and out of the cloth or other material to be sewed, one of the said guides shall lay its thread in the hook of the needle, while during the next passage of the needle through and out of the cloth, the other guide shall lay its thread in the hook of the needle, each guide acting alternately, all substantially as hereinbefore specified.

2. And, for the purpose of enabling a machine of the above description, (or one in which two thread-guides and a single needle are employed to sew with two threads,) to be used for producing the chain-stitch with one single thread passed through one of the two eyes $s$ $t$ of the two thread-guides H I, as described, I claim the construction of one of the said guides —viz., the guide I—with the long slot $u$ for receiving the thread in its passage to and through the other guide, as specified.

3. I also claim the above-described peculiar mode of sewing cloth or other fabric—viz., the combination of two threads with the fabric and with each other, in such manner that each thread extends through the fabric in loops, and the loops of each thread are interlooped at one side of the fabric with the loop of the other thread, so that the threads alternately bind each other and constitute a compound chain-stitch, substantially as specified.

4. I also claim the combination of the needle-slide with instrumentalities for producing friction upon it, so as to hold it from commencing to move at the same instant as the needle, substantially as before set forth.

5. I also claim the combination of the needle-slide with the bumpers for moving it at the required times, substantially as before set forth.

6. I also claim the combination of the nee-

BEST AVAILABLE COPY dle-carrier with a guide, substantially as described, applied to the carrier, and constructed to enter the longitudinal groove of the needle-shank, as set forth.

7. I also claim the combination, substantially as set forth, of the needle-carrier with the closing slide of the hooked needle arranged parallel with said needle on the same side thereof as the barb or hook, and operated by the needle-carrier, substantially as described.

Witness my hand this 8th day of January, A. D. 1872.

WILLIAM WICKERSHAM.

Witnesses:

A. L. WEBB,

W. B. HARRINGTON.